C. J. FECHHEIMER.
WINDING FOR DYNAMO ELECTRIC MACHINES.
APPLICATION FILED DEC. 11, 1907.
1,066,893.
Patented July 8, 1913.
2 SHEETS—SHEET 1.
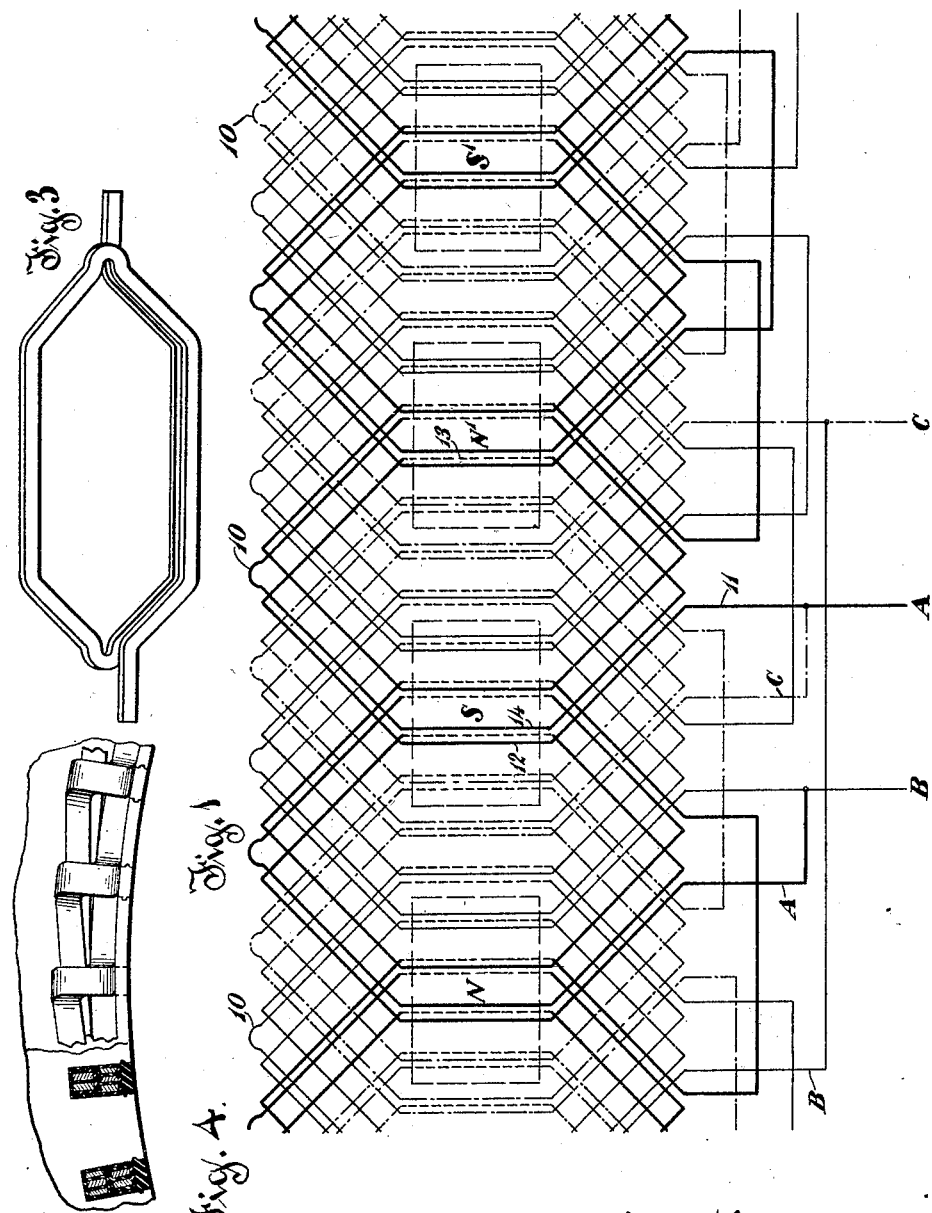

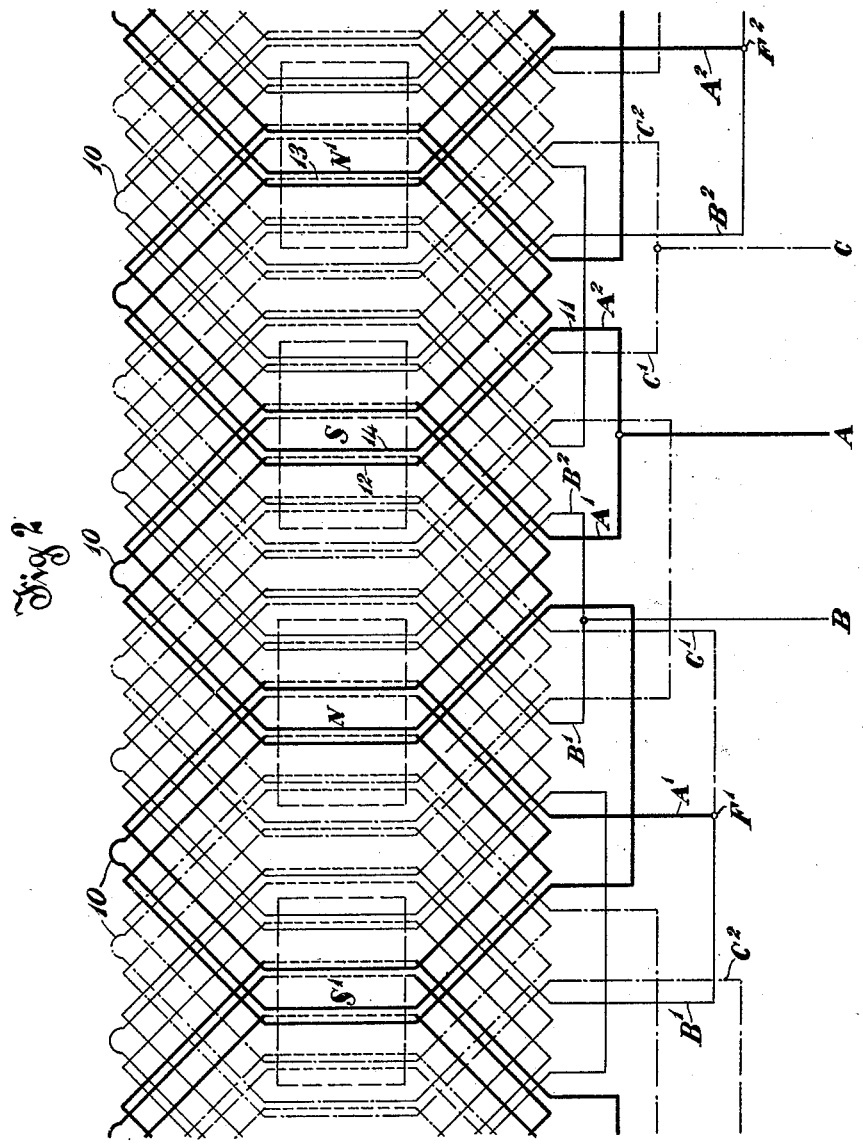

UNITED STATES PATENT OFFICE.

CARL J. FECHHEIMER, OF CINCINNATI, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

WINDING FOR DYNAMO-ELECTRIC MACHINES.

1,066,893.      Specification of Letters Patent.      Patented July 8, 1913.

Application filed December 11, 1907. Serial No. 405,994.

*To all whom it may concern:*

Be it known that I, CARL J. FECHHEIMER, citizen of the United States, residing at Cincinnati, in the county of Hamilton and State of Ohio, have invented certain new and useful Improvements in Windings for Dynamo-Electric Machines, of which the following is a full, clear, and exact specification.

My invention relates to windings for dynamo-electric machines.

In designing dynamo-electric machines cases often arise in which it is desired that each slot of a distributed armature or field winding have an odd or a fractional number of effective or active conductors. By the term "effective conductors in each slot" is meant the number of actual conductors in each slot multiplied by the proportional part of the total current (per leg if a polyphase alternating current machine) carried by each conductor; in other words, the number of actual conductors in a slot divided by the number of parallel circuits of the winding; or the equivalent number of conductors carrying the full current which would produce the same effect. In order that this may be obtained with the ordinary two layer drum windings in general use composed of previously formed coils all of the same number of turns, in which all the coil leads are brought out at the same end of the armature, it is necessary to use a winding which has a number of parallel circuits not less than twice the denominator of the fraction (in its lowest terms) which expresses the number of effective conductors per slot, unity being taken as such denominator when the number is an odd integer. Thus in such a winding it is necessary to use a two-circuit winding for an odd number of effective conductors per slot, a four-circuit winding for an odd number of effective half conductors per slot, etc. In machines having a number of field poles not a multiple of four, a simplex four-circuit armature winding can not be obtained without producing an undesirable circulating current in the winding. Similarly, for an eight-circuit armature winding the number of field poles must be a multiple of eight in order to avoid circulating currents. These conditions are often impossible, or at least undesirable. There are sometimes other disadvantages in windings having a large number of parallel circuits.

It is the object of my present invention to provide an arrangement whereby with the conditions otherwise the same the desired odd or fractional number of effective conductors per slot in a drum winding may be obtained with a winding in which the number of parallel circuits is less than that which is necessary with the ordinary winding. The term "drum winding" is intended to apply whether such winding is on the outside or inside surface of a drum or cylinder. By my arrangement it is possible to make a simplex drum winding of previously wound coils all having the same number of turns, and in which the number of circuits of the winding is equal to the smallest possible denominator of the fraction expressing the number of effective conductors per slot, instead of being equal to twice such denominator. This is accomplished by making the previously wound coils of an odd number of half turns each, so that their free ends come at opposite ends of the machine, the free ends of the coils at the back end of the winding being connected in pairs.

The various novel features of my invention will appear from the description and drawings and will be particularly pointed out in the claims.

Figure 1 shows diagrammatically a four-pole, three-phase, lap, delta connected, one-circuit winding, having two slots per pole per phase, illustrating one simple embodiment of my invention; Fig. 2 shows a similar illustrative diagram of a four-pole, three-phase, lap, star connected, two-circuit winding, having two slots per pole per phase; Fig. 3 is an isometric view of one of the previously formed coils; and Fig. 4 is an end view of a group of coils located in slots, some of said coils being in section.

In Figs. 1 and 2 the three phases of the drum winding of an armature are represented respectively by heavy, light, and dot and dash lines, and the field poles by dash lines. The armature windings are composed of previously formed coils and are located in slots, in each of which slots there are two layers, the lower layer being shown in dotted lines while the upper layer is shown in the kind of line suitable for the particular phase. Though for the sake of simplicity only four field poles are shown, any desired number of such field poles may be used, these field poles being fixed relatively to each other but movable relatively to the armature and its winding.

According to my invention the previously formed armature coils each have an odd number of half turns, one free end of each coil being at each end of the armature. In the arrangement shown, with an even number of slots per pole per phase, all the free ends at one side of the armature are joined by loops such as 10. For simplicity in the diagrams, each of the previously formed coils is shown with but one turn and a half, or three half turns, though any other odd number of half turns may be used. One such coil for phase A is shown in Fig. 3, and is indicated in each of Figs. 1 and 2 as starting at 11, going by conductor 12 through a slot opposite pole S, by conductor 13 through a slot opposite pole N′, and by conductor 14 through a slot opposite the aforesaid pole S to the loop 10, where it is connected to an adjacent coil of the same phase. Thus one side of each coil has one more conductor than the other side has, and the windings illustrated are lap windings. Alternate coils of each phase are wound respectively right and left handed, and when placed in the slots of the core have for the lower layers the sides of the coils having respectively the larger and the smaller number of conductors, the other sides of the same coils forming the upper layers in other slots, in which there are alternately sides having the smaller and the larger number of conductors respectively.

The free ends of the coils at the other end of the armature may be connected in various ways to produce various results. In Fig. 1 the coils are connected in delta, the starting points of the phases A, B, and C being connected to the finishing points of the phases C, A, and B respectively. The windings of the three phases could be star connected, however, such an arrangement being indicated for a two-circuit winding in Fig. 2, where the finishing points of the three phases of the two circuits are connected at the points F′ and F² respectively.

The winding of Fig. 1 is a plain series winding for each phase, each slot having three effective conductors, one in the lower layer and two in the upper layer in the alternate slots, and two in the lower layer and one in the upper for the remaining slots. In this arrangement the denominator of the fraction expressing the number of effective conductors per slot is one, which is the number of circuits of the winding. With the same arrangement there could also be five, seven, or any other odd number of active conductors per slot, the previously formed coils then consisting of a corresponding number of half turns.

In Fig. 2 a two-circuit winding is shown, the phases A, B, and C dividing into the circuits A′ and A², B′ and B², and C′ and C² respectively. As stated above, the finishing points of the circuits A′, B′ and C′ are joined at F′, and the finishing points of the circuits A², B² and C² at F². The points F′ and F² may be identical if desired. As in Fig. 1, each slot has three conductors, but since these conductors each carry but half of the current the number of effective conductors is reckoned as one-half of the number of actual conductors in the slot, in this case as one and one-half, or three halves, effective conductors per slot. The denominator of this fraction is two, which, as in the preceding case, is the number of circuits of the armature. As before, there can be any desired odd number of actual conductors in each slot, but the number of effective conductors per slot in this case is just half the number of actual conductors.

By similar combinations it is possible to get any desired fractional number of effective conductors per slot, as the two arrangements shown are merely illustrative and show two of the most simple cases. Thus, though the number of slots per pole per phase is shown as two, it is not limited to that number, or, indeed, to an even number. The connections shown at the upper and lower sides respectively of the winding are not necessarily, and in some of the more complicated embodiments of the invention are not actually, arranged on such sides. The windings may be either delta or star connected, whatever the number of circuits. The windings shown are applicable without change to induction motors. While only three-phase windings are here shown, my invention is equally applicable to alternating current machines of any other number of phases. It is also applicable to direct current machines, in which, however, it is necessary to have an even number of circuits for an armature winding. In some cases, it might be more convenient so to arrange the winding that while the average number of actual conductors per slot is odd, or even fractional, the number of actual conductors in some slots is even. In such cases there would not be the same number of actual conductors in all of the slots. It is also possible in some cases to arrange the winding in a single layer, as, for example, by placing in separate slots the conductors which are illustrated as forming the lower and upper layers respectively.

Many modifications may be made in the precise arrangement here shown and described without departing from the spirit and scope of my invention, and all such I aim to cover in the following claims.

What I claim as new is:—

1. In a dynamo-electric machine, a slotted core, a two-layer winding comprising previously formed coils located in the slots in the core with each coil forming the upper layer in one slot and the lower layer in another, the upper and lower layers in each slot having unequal numbers of conductors.

2. In a dynamo-electric machine, a slotted core, and a two-layer winding comprising previously formed coils located in the slots of the core with each coil forming the upper layer in one slot and the lower layer in another, one layer in each slot having one more conductor than the other layer.

3. In a dynamo-electric machine, a slotted core, and a winding comprising previously formed coils which are located in two layers in the slots in the core and have end turns which project in different directions from the upper and lower layers in the slots, the sum of the conductors of the upper and lower layers in any one slot being an odd number.

4. In a dynamo-electric machine, a slotted core, and a winding having two layers located in the slots of the core, the upper layer in alternate slots having respectively one more and one less conductor than the lower layer in such slots.

5. In a dynamo-electric machine, a slotted core, and a drum winding located in two layers in the slots in said core and having end turns which project in different directions from the upper and lower layers in the slots, the number of effective conductors per slot being an odd multiple of the reciprocal of the number of parallel circuits of the winding.

6. In a dynamo-electric machine, a slotted core, and a drum winding located in two layers in the slots in said core and having end turns which each extend from the upper layer in one slot to the lower layer in another slot, the number of effective conductors per slot when expressed as a fraction in its lowest terms having as a denominator the number of parallel circuits in the winding.

7. An alternating current dynamo-electric machine having a distributed winding composed of a plurality of circuits which are permanently closed and in parallel and are formed of a number of previously formed coils each having an odd number of half turns greater than unity.

8. An alternating current dynamo-electric machine having a distributed winding composed of a number of circuits permanently closed and in parallel and formed of a plurality of previously wound coils having at least one complete turn each, the free ends of each coil being at opposite ends of the machine.

9. An alternating current dynamo-electric machine which has a slotted core and a drum winding, the latter being located in two layers in the slots in said core and having end turns which project in opposite directions from the upper and lower layers, and each slot containing an odd number of conductors.

10. An alternating current dynamo-electric machine having a slotted core and a polyphase multi-circuit winding, the latter being located in two layers in the slots in said core and having end turns which each extend from the upper layer in one slot to the lower layer in another, and the number of effective conductors per slot of said winding being an odd multiple of the reciprocal of the number of parallel circuits for each phase.

11. In a dynamo-electric machine, a drum armature having a slotted core and a winding closed at all times, said winding being composed of previously formed coils each having two sides which are located in different slots and are composed of different numbers of conductors.

12. In a dynamo-electric machine, a drum armature having a slotted core and a winding closed at all times, said winding being composed of coils each having two sides which are located in different slots and one of which comprises one more conductor than the other.

13. In a dynamo-electric machine, a drum armature having a slotted core and a winding, said winding being composed of coils having end turns which each pass over some and under some of the end turns of adjacent coils and also having two sides which are located in different slots and are composed of different numbers of conductors, all of said coils being closed at all times.

14. In a dynamo-electric machine, a drum armature having a slotted core and a winding closed at all times, said winding being composed of previously formed coils, each coil having two sides which are located in different slots and one of which has one more conductor than the other, and each coil also having an end turn which passes over some and under some of the end turns of the neighboring coils.

15. In a dynamo-electric machine, a core, and a drum winding thereon composed of coils all permanently closed and each having two sides which are composed of different numbers of conductors.

16. In a dynamo-electric machine, a core, and a winding thereon composed of previously formed coils all permanently closed and each having two sides which are composed of different numbers of conductors.

In testimony whereof I affix my signature, in the presence of two witnesses.

CARL J. FECHHEIMER.

Witnesses:
 GEO. B. SCHLEY,
 FRED J. KINSEY.

Copies of this patent may be obtained for five cents each, by addressing the "Commissioner of Patents, Washington, D. C."